United States Patent
Blenkinsop et al.

[11] Patent Number: 6,109,478
[45] Date of Patent: Aug. 29, 2000

[54] CONVEYING OF MATERIALS

[75] Inventors: Michael Glen Blenkinsop; Roland Arnold Vial, both of Middelburg; Kevin Carew, Randburg; Jeffrey Carew, Fourways, all of South Africa

[73] Assignees: ESKOM; Krew Ventilation (Proprietary Limited), both of Gauteng, South Africa

[21] Appl. No.: 09/178,177

[22] Filed: Oct. 23, 1998

[30] Foreign Application Priority Data

Oct. 24, 1997 [ZA] South Africa .................. 97/9559

[51] Int. Cl.⁷ .................................................. G01G 13/00
[52] U.S. Cl. ........................ 222/77; 222/56; 222/412; 177/119
[58] Field of Search ........................ 222/55, 56, 58, 222/77, 412, 413; 177/119

[56] References Cited

U.S. PATENT DOCUMENTS

| | | |
|---|---|---|
| Re. 30,967 | 6/1982 | Ferrara et al. . |
| 3,212,674 | 10/1965 | Martin ........................... 222/56 |
| 3,537,511 | 11/1970 | Maag . |
| 3,773,221 | 11/1973 | Lesk et al. ................... 222/56 |
| 3,804,298 | 4/1974 | Ricciardi ....................... 222/56 |
| 3,889,848 | 6/1975 | Ricciardi et al. . |
| 4,221,507 | 9/1980 | Olney . |
| 4,488,664 | 12/1984 | Cleland ........................ 222/56 |
| 4,579,252 | 4/1986 | Wilson et al. . |
| 4,723,614 | 2/1988 | Lahti . |
| 4,771,915 | 9/1988 | Cand et al. ................... 222/56 |
| 4,818,549 | 4/1989 | Steiner et al. . |
| 5,423,456 | 6/1995 | Arendonk . |
| 5,670,751 | 9/1997 | Hafner . |

FOREIGN PATENT DOCUMENTS

| | | |
|---|---|---|
| 139060 | 7/1983 | European Pat. Off. . |
| 279353 | 8/1988 | European Pat. Off. . |
| 290999 | 11/1988 | European Pat. Off. . |
| 396468 | 11/1990 | European Pat. Off. . |
| 2440576 | of 0000 | France . |
| 2440577 | 10/1978 | France . |
| 2587482 | 9/1995 | France . |
| 920475201 | 4/1992 | Germany . |
| 4436767 | 4/1996 | Germany . |
| 672980 | 5/1949 | United Kingdom . |

*Primary Examiner*—Kevin Shaver
*Assistant Examiner*—Thach Bui
*Attorney, Agent, or Firm*—Rockey, Milnamow & Katz, Ltd.

[57] ABSTRACT

Materials conveying equipment 10 includes a support structure 12. A housing 20 is mounted on the support structure 12, the housing 20 having an inlet opening 26 and a remote discharge opening. A shaftless screw conveyor 18 is arranged rotatably in the housing 20 for conveying materials from the inlet opening 26 of the housing 20 to the discharge opening of the housing 20. A gravimetric unit 16 is mounted at the discharge opening for receiving the materials.

14 Claims, 2 Drawing Sheets

CONVEYING OF MATERIALS

BACKGROUND OF THE INVENTION

THIS INVENTION relates to the conveying of materials. More particularly, the invention relates to materials conveying equipment.

SUMMARY OF THE INVENTION

According to the invention, there is provided materials conveying equipment which includes a support structure;

a housing mounted on the support structure, the housing having an inlet opening and a remote discharge opening;

a shaftless screw conveyor arranged rotatably in the housing for conveying materials from the inlet opening of the housing to the discharge opening of the housing; and a gravimetric unit mounted at the discharge opening for receiving the materials.

By "gravimetric" is meant that the materials to be conveyed are controlled by monitoring the mass of the materials.

A feed means may be mounted on the housing in communication with the inlet opening for directing the materials into an interior of the housing. The feed means may be in the form of a feed chute.

The housing may be In the form of a tube having the inlet opening defined in a side wall of the Tube proximate one end of the tube with the discharge opening being defined in an opposed end of the tube. The tube may have an inner diameter greater than an outer diameter of the conveyor.

The equipment may include a, receiving means which defines a receiving zone into which the materials, discharged by the screw conveyor from the housing, are received. The receiving means may be arranged, intermediate the housing and the gravimetric unit, at the discharge opening of the housing. The receiving means may include a length of tubing having an inner diameter greater than that of the tube.

The gravimetric unit may include a circular cylindrical casing having substantially the same diameter as that of the length of tubing of the receiving means.

A sealing means may be arranged between an outlet end of the length of tubing of the receiving means and an inlet end of the casing of the gravimetric unit.

The sealing means may comprise a flexible seal. The flexible seal may include two annular members of a low-friction material, one of the annular members being mounted about the outlet end of the receiving means with the other of the annular members being mounted about the inlet end of the weigh tube.

The seal may include an urging means for urging the annular members into abutment with each other. The urging means may comprise a compressible element mounted behind at least one of the annular members, the compressible element being of an elastomeric material. An advantage of this arrangement is that, due to displacement of the weigh tube relative to the receiving means, in use, self-cleaning of the seal can be effected.

The casing may be in the form of a weigh tube, a load measuring means being carried on the weigh tube.

Preferably, the weigh tube is mounted in a cantilevered manner on the support structure.

Then, an arm arrangement may project from one side of the tube, the arm arrangement lying in a plane which bisects a longitudinal axis of the weigh tube, one and of the arm arrangement being mounted via a pivot-axis defining assembly on the support structure with the weigh tube being supported at an opposed end of the arm arrangement.

The load measuring means may be arranged on a diametrically opposed side of the weigh tube. The loud measuring means may comprise a plurality of load cells arranged at longitudinally spaced intervals on said opposed side of the weigh tube, the load cells lying in the plane.

A discharge means may be arranged at an outlet end of the weigh tube. The discharge means may be a discharge chute.

The outlet end of the weigh tube; may be connected to the discharge chute by means of a coupling. The coupling may be a flexible bellows-type seal.

The invention extends also to a feeder for a mill which includes materials conveying equipment as described above.

The mill may be a coal mill.

The invention is now described by way of example with reference to the accompanying diagrammatic drawings,

DETAILED DESCRIPTION OF THE DRAWINGS

Figure 1:
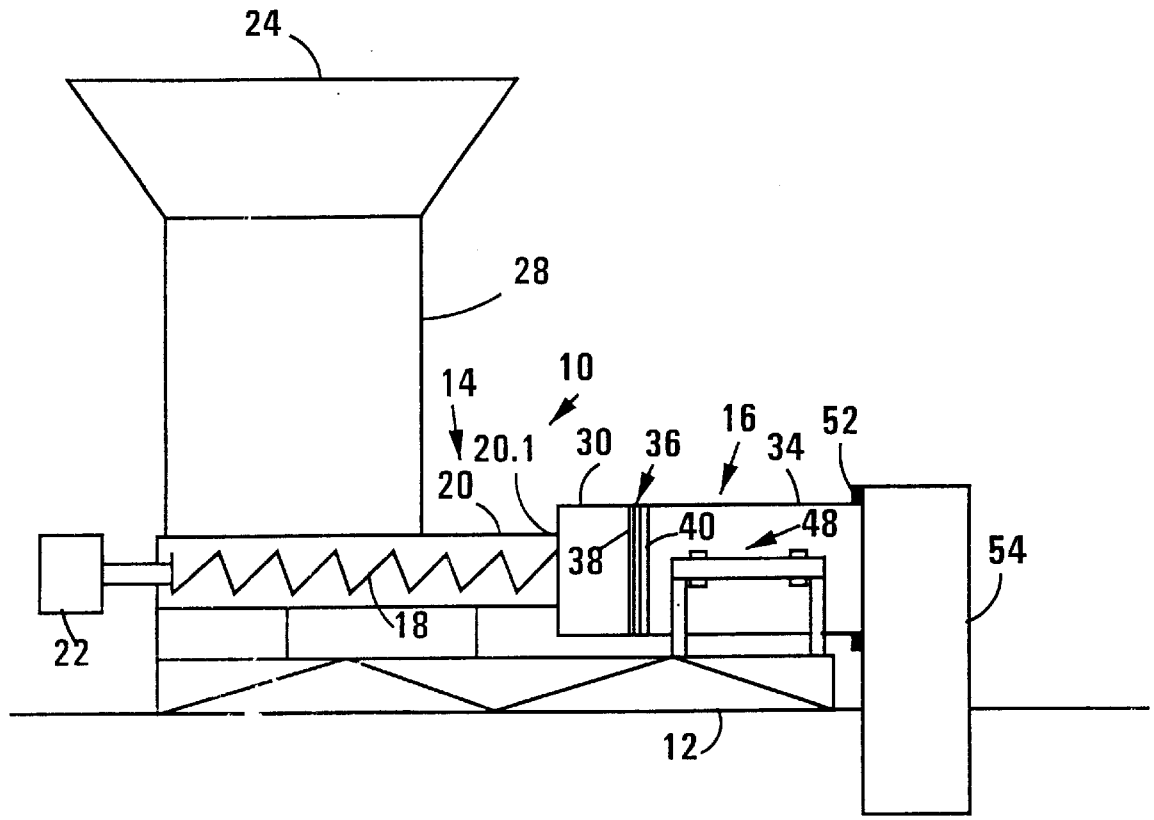
FIG. 1 shows a schematic side view of materials conveying equipment, in accordance with the invention.

Referring to the drawings materials conveying equipment, in accordance with the invention, is illustrated and is designated generally by the reference numeral 10. The equipment 10 includes a support structure in the form of a frame 12. A screw-type conveying device 14 is mounted on the frame 12 and a gravimetric unit 16 is arranged downstream of the conveying device 14.

The conveying device 14 comprises a shaftless screw conveyor 18 rotatably mounted in a tube 20. A prime mover in the form of an electric motor 22 drives the conveyor 18. The motor 22 drives the conveyor 18 via a reduction gearbox. The motor 22 is a 3 kW motor and the reduction gearbox has a reduction ratio of 158:1 to give a torque rating of approximately 2700 Nm. The advantage of this arrangement is that only one bearing is required which is not in contact with the materials to be conveyed. This, together with the fact that there is only one moving part, being the spiral conveyor 18, minimizes downtime on the equipment 10 for maintenance purposes. Typically, the conveyor 18 has a diameter of approximately 420 mm with the tube 20 having a slightly greater inner diameter.

Another advantage of the use of a shaftless screw conveyor 18 is that the tube 20 has a greater carrying capacity of material in comparison with shafted screw conveyors thereby allowing a greater throughput of material.

The invention is Intended particularly for use in the feeding of coal from a bunker 24 to a coal mill in a controlled, accurate manner and will be described with reference to that application hereafter. Those skilled in the art will, however, appreciate that the equipment 10 could be used in other applications.

Figure 2:
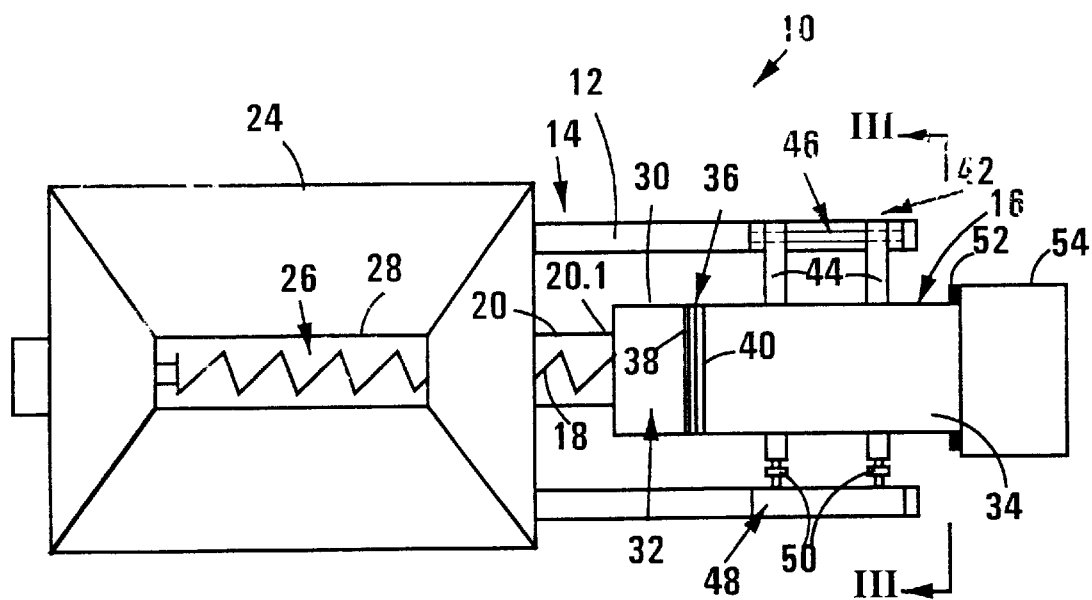
FIG. 2 shows a schematic plan view of the equipment.
Figure 3:
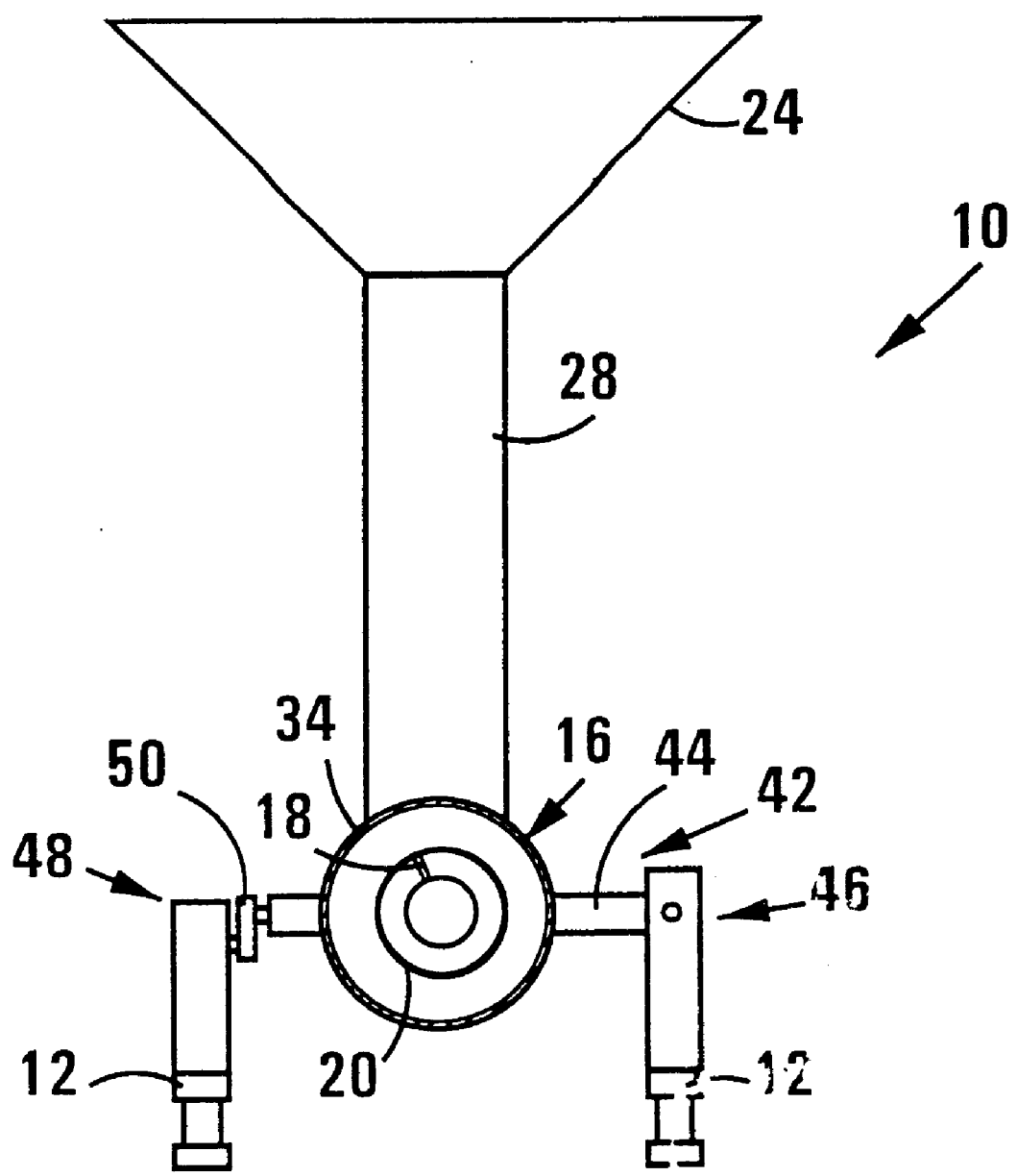
FIG. 3 shows an sectional view of the equipment taken along line III—III of FIG. 2.

Thus, an inlet opening 26 (FIG. 2) is defined in the tube 20 of the conveying device 14 to charge coal from the bunker 24 into the tube 20 of the conveying device 14. An outlet of the bunker 24 is in communication with the inlet opening 26 via a feed chute 28.

A discharge end 20.1 of the tube 20 of the conveying device 14 is connected to the gravimetric unit 16 via a receiving means in the form of a length of tubing 30. The diameter of the tubing 30 is greater than the diameter of the tube 20 of the conveying device 14. The tubing 30 defines a receiving zone 32 in which coal can be received to build up should the equipment 10 stand idle for any length of time rather than having a build up of coal in the gravimetric unit 16. The tubing 30 has an inner diameter of approximately 470 mm.

The gravimetric unit 16 comprises a weigh tube 34 which is co-axially aligned with the receiving tube 30 and which is of substantially the same diameter as the receiving tube 30. A sealing means or flexible seal 36 is arranged between an outlet end of the tubing 30 and an inlet end of the weigh tube 34. The sealing means 36 comprises a first annular member 38 of a low friction material mounted about the outlet end of the tubing 30 and a second annular member 40, also of a low friction material, mounted about an inlet end of the weigh tube 34. At least one of the annular members 38 or 40 has an urging means in the form of a compressible rubber ring (not shown) mounted behind it to urge the annular members 38 and 40 into abutment with each other. The annular members 38 and 40 provide a low friction seal and are preferably of a Vesconite material.

The weigh tube 34 is mounted on the frame 12 via an arm arrangement 42. The arm arrangement 42 comprises a pair of spaced arms 44 projecting radially outwardly from one side of the weigh tube 34. Free ends of the arm are connected via a hinge assembly 46 to the frame 12 so that the weigh tube 34 is supported cantilever-fashion on the frame 12.

A load measuring means 48 is arranged on a diametrically opposed side of the weigh tube 34. The load measuring means comprises a pair of longitudinally spaced load cells 50. The load cells 50 are parallelogram-type load cells which compensate for lateral forces and only measure nett downward forces.

An outlet end of the weigh tube 34 is connected via a flexible bellows-type seal 52 to a discharge chute 54. The seal 52 is provided for maintaining pressure in the equipment 10.

In use, the speed of The conveyor 18 is set to obtain the approximate feedrate of coal by adjusting an AC invertor which supplies power to the motor 22.

Coal to be fed to the mill is discharged through the chute 28 into the conveying device 14. Due to the fact that the chute 28 is substantially vertical, the likelihood of coal hang-ups occurring is reduced. Further, by feeding the coal directly into the conveying device 14, the conveying device 14 acts as a "live bottom" removing the coal as it is received in the tube 20. Rotation of the screw conveyor 18 passes the material through the receiving section 30 into the weigh tube 34 where the mass of the volume of coal in the weigh tube 34 is measured. In this regard, the dimensions of the weigh tube 34 are selected so that the ratio of weigh tube mass to mass of coal in the weigh tube is approximately 1:1.6. The cantilevered mounting arrangement of the weigh tube 34 on the frame 12 inhibits twisting of the weigh tube 34 thereby reducing errors in the measurement of the mass. Further, the arrangement of the hinge assembly 46 and the arrangement of the load cells 50 reduces the effect of sliding frictional forces in the direction of transportation of the coal on the measurement of mass.

By controlling the speed of rotation of the screw conveyor 18, an accurate feedrate of coal can be obtained. Experiments with a prototype have revealed that an accuracy of 98% can be obtained. Further, it has been found that coal of various grades (in respect of size) as well as dryness can be fed with equal accuracy by means of the equipment 10.

Further, the equipment 10 can operate both as a volumetric feeder and as a gravimetric feeder. The benefit of this is that a boiler to be fed, or any other piece of plant operating in a controlled feedrate environment, can be controlled either volumetrically or gravimerically while being monitored in the other mode.

It is a particular advantage of these invention that low cost equipment 10 is provided which operates with the required accuracy and which can be used both in a gravimetric mode and a volumetric mode.

What is claimed is:

1. Materials conveying equipment which includes
   a support structure;
   an elongate housing having opposed first and second ends, the housing being mounted on the support structure, and the housing having an inlet opening and a remote discharge opening, the discharge opening being defined in the second end of the housing;
   a screw conveyor arranged rotatably in the housing for conveying materials from the inlet opening of the housing to the discharge opening of the housing; and
   a gravimetric unit mounted at the discharge opening for receiving the materials, the gravimetric unit including an elongate casing having opposed first and second ends, the casing having an inlet defined in the first end thereof and an outlet remote from the inlet, the housing and the casing being arranged end-to-end with the discharge opening of the housing being in communication with the inlet of the casing, to permit material discharged from the discharge opening of the housing to be received into the inlet of the casing and to displace material in the casing towards the outlet of the casing to be discharged therefrom.

2. The equipment as claimed in claim 1 in which a feed means is mounted on the housing in communication with the inlet opening for directing the materials into an interior of the housing.

3. The equipment as claimed in claim 1 in which the housing is in the form of a tube having the inlet opening defined in a side wall of the tube proximate the first end of the tube.

4. The equipment as claimed in claim 3 which includes a receiving means which defines a receiving zone into which the materials discharged by the screw conveyor from the housing are received, the receiving means being arranged intermediate the discharge outlet of the housing and the inlet of the casing of the gravimetric unit.

5. The equipment as claimed in claim 4 in which the receiving means includes a length of tubing having an inner diameter greater than that of the tube and arranged coaxially therewith.

6. The equipment as claimed in claim 5 in which the casing of the gravimetric unit is circular, cylindrical in shape having substantially the same diameter as that of the length of tubing of the receiving means.

7. The equipment as claimed in claim 6 in which a sealing means is arranged between an outlet end of the length of tubing of the receiving means and the inlet end of the casing of the gravimetric unit.

8. The equipment as claimed in claim 6 in which the casing is in the form of a weigh tube, a load measuring means being carried on the weigh tube.

9. The equipment as claimed in claim 8 in which the weigh tube is mounted in a cantilevered manner on the support structure.

10. The equipment as claimed in claim 9 in which an arm arrangement projects from one side of the tube, the arm arrangement lying in a plane which includes a longitudinal axis of the weigh tube, one end of the arm arrangement being mounted via a pivot-axis defining assembly on the support structure with the weigh tube being supported at an opposed end of the arm arrangement.

11. The equipment as claimed in claim 10 in which the load measuring means is arranged on a diametrically opposed side of the weigh tube.

12. The equipment as claimed in claim 11 in which the load measuring means comprises a plurality of load cells arranged at longitudinally spaced intervals on said opposed side of the weigh tube, the load cells lying in the plane.

13. The equipment as claimed in claim 8 in which a discharge means is arranged at an outlet end of the weigh tube.

14. The equipment as claimed in claim 1 in which the screw conveyor is a shaftless screw conveyor.

* * * * *